(12) United States Patent
Nishizawa et al.

(10) Patent No.: US 7,942,226 B2
(45) Date of Patent: May 17, 2011

(54) MOTORCYCLE

(75) Inventors: Kazuya Nishizawa, Iwata (JP); Satoshi Terumichi, Iwata (JP); Hiroshi Shimomura, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 255 days.

(21) Appl. No.: 12/244,347

(22) Filed: Oct. 2, 2008

(65) Prior Publication Data

US 2009/0090576 A1   Apr. 9, 2009

(30) Foreign Application Priority Data

Oct. 3, 2007   (JP) .................................. 2007-259648

(51) Int. Cl.
*B62K 11/00*   (2006.01)
(52) U.S. Cl. ....................................... 180/219; 180/68.3
(58) Field of Classification Search .................. 180/68.3, 180/219
See application file for complete search history.

(56) References Cited

U.S. PATENT DOCUMENTS

| | | | | |
|---|---|---|---|---|
| 4,799,569 | A * | 1/1989 | Hattori et al. ................. | 180/219 |
| 7,059,438 | B1 * | 6/2006 | Sheets ........................... | 180/68.1 |
| 7,766,119 | B2 * | 8/2010 | Yokoi et al. .................... | 180/311 |
| 2001/0050193 | A1 * | 12/2001 | Yoshida et al. ............... | 180/219 |

FOREIGN PATENT DOCUMENTS

| | | |
|---|---|---|
| DE | 10 2005 044 138 A1 | 4/2006 |
| EP | 1 762 442 A1 | 3/2007 |
| JP | 63-145189 | 6/1988 |
| JP | 63-166674 A | 7/1988 |
| JP | 09-123973 | 5/1997 |
| JP | 2001-106151 A | 4/2001 |
| JP | 3701716 | 7/2005 |
| JP | 2007-32428 A | 2/2007 |

OTHER PUBLICATIONS

Official Communication issued in corresponding European Patent Application No. 08 25 3197, completed on Jan. 20, 2011.

\* cited by examiner

*Primary Examiner* — Joanne Silbermann
*Assistant Examiner* — Jacob Knutson
(74) *Attorney, Agent, or Firm* — Keating & Bennett, LLP (57) ABSTRACT

A motorcycle includes a body frame having right and left frame members 15R and 15L and an air cleaner 10 having an air cleaner case 3 and an air filter element 6. The air cleaner case 3 includes a lower section 3a, a part of which being positioned between the frame members 15R and 15L and an upper section 3b protruding upward from the lower section 3a above the frame members 15R and 15L and laterally extending outward. The upper section 3b is positioned above the frame members 15R and 15L and laterally outward of inner ends 15a of the right and left frame members 15R and 15L. The upper section 3b has a seal section 26. The air filter element 6 is supported and sealed by the seal section 26 so as to divide the inner space of the air cleaner case 3 into an upper space and a lower space.

19 Claims, 10 Drawing Sheets

MOTORCYCLE

This application claims priority under 35 U.S.C. §119 to Japanese Patent Application No. 2007-259648 filed on Oct. 3, 2007, the entire disclosure of which is incorporated herein by reference in its entirety.

BACKGROUND OF THE INVENTION

1. Field of the Invention

The preferred embodiments of the present invention relate, inter alia, to a motorcycle equipped with an air cleaner.

2. Description of the Related Art

The following description sets forth the inventor's knowledge of related art and problems therein and should not be construed as an admission of knowledge in the prior art.

Conventionally, there is known a motorcycle in which a pair of right and left frames extending rearward from a head pipe are provided and at least a part of an air cleaner is disposed between both the frames (see, e.g., Japanese Unexamined Laid-open Patent Publication No. S63-145189 (hereinafter referred to as "Patent Document 1") and Japanese Patent Publication No. 3701716 (hereinafter referred to as "Patent Document 2"). The air cleaner includes an air cleaner case and an air filter element disposed in the air cleaner case.

Although the aforementioned Patent Documents 1 and 2 do not clearly describe how the air filter element of the air cleaner is disposed, in a state in which at least a part of the air cleaner is disposed between the right and left frames, if the air filter element is disposed so as to divide the inner space of the air cleaner case into an upper space and a lower space, the following problems will occur.

Figure 10:
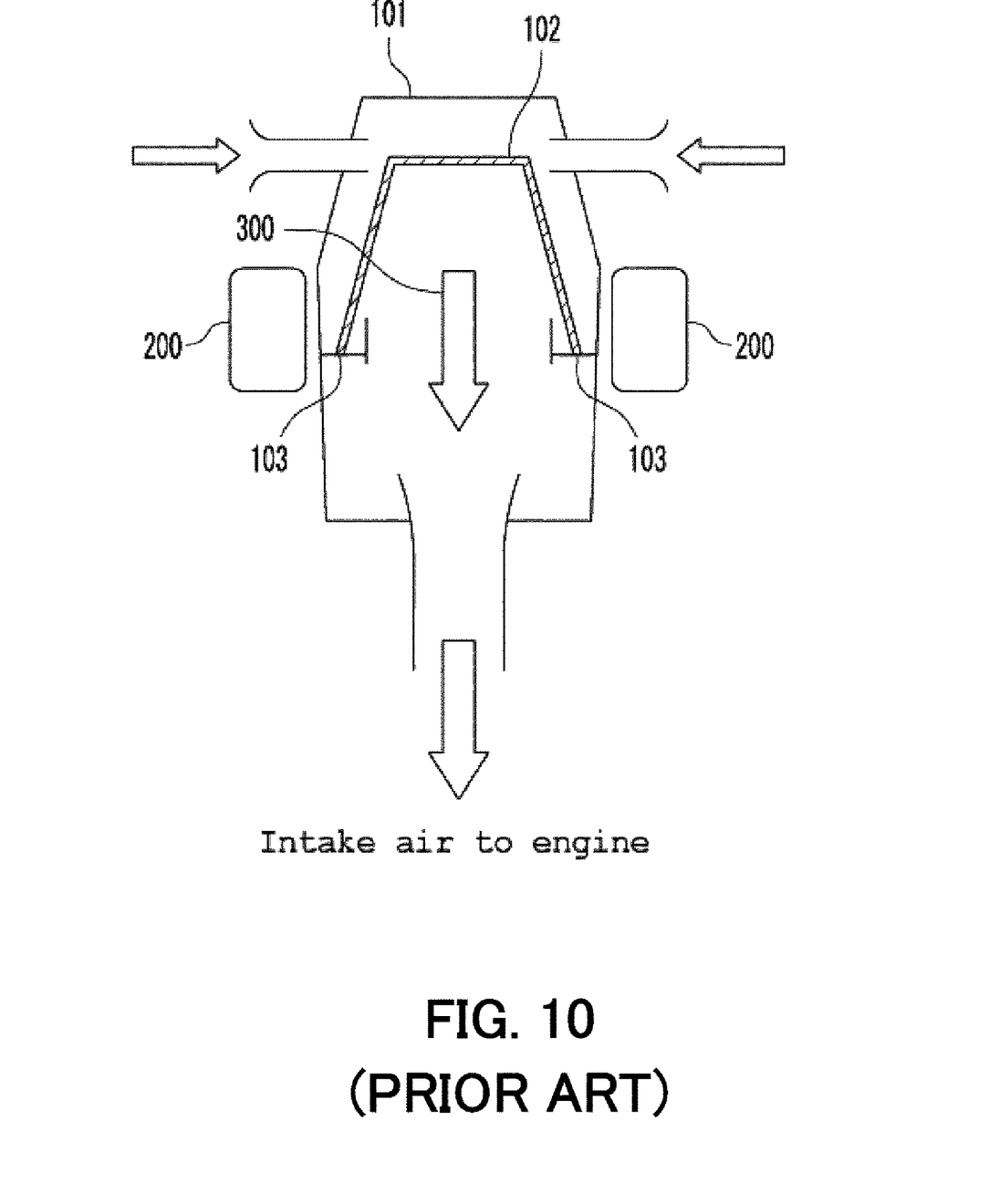
FIG. 10 is a schematic cross-sectional view of a conventional air cleaner.

An air cleaner is configured to remove foreign matters, such as, e.g., grit or dust (hereinafter simply referred to as "dust" or "foreign matters") in air by passing air through the air filter element. Therefore, it is essential to assuredly prevent the air from bypassing the air filter element, which in turn requires assured sealing of the peripheral edge of the air filter element. However, as shown in FIG. 10, in a state in which an air cleaner case 101 is disposed between a pair of right and left frames 200 and 200, if a seal section 103 for sealing an air filter element 102 is disposed between the frames 200 and 200, the passage area of an air flow 300 mainly flowing generally vertically in the air cleaner case 101 becomes narrow at the inner side of the seal section 103. Such a small passage area of the air flow 300 in the air cleaner case 101 may sometimes cause insufficient intake volume of air to be supplied to an engine at the time of, e.g., a sudden opening operation of a throttle.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some preferred embodiments can provide a motorcycle capable of providing a sufficient intake volume of air to be supplied to an engine even in the motorcycle provided with an air cleaner having an air cleaner case disposed between a pair of right and left frames of the motorcycle and an air filter element disposed in the air cleaner case so as to divide a part of an inner space of the air cleaner case into an upper space and a lower space.

A motorcycle according to a preferred embodiment of the present invention includes a body frame having a head pipe and right and left frame members extending rearward from the head pipe in a side view thereof, and an air cleaner having an air cleaner case and an air filter element disposed inside the air cleaner case for purifying air to be supplied to an engine by passing the air there-through. The air cleaner case includes a lower section, at least a part of the lower section being disposed between the right and left frame members, and an upper section having a seal section disposed above the frame members, at least a part of the seal section being positioned laterally outward of inner ends of the right and left frame members, and the upper section upwardly protruding from the lower section so as to be positioned above the right and left frame members and laterally extending outward of the right and left frame members. The air filter element is supported and sealed by the seal section and divides at least a part of an inner space of the air cleaner case into an upper space and a lower space.

In this disclosure, the phrase of "divide at least a part of an inner space into an upper space and a lower space" includes, e.g., not only the meaning of dividing the inner space into an upper space and a lower space in a vertical direction with a generally horizontal divider but also the meaning of dividing the inner space into an upper space and a lower space in a direction inclined with respect to a vertical direction with a divider inclined from a horizontal plane as shown in this embodiment (in other words, obliquely dividing the inner space into an upper space and a lower space). In this disclosure, the terminology vertical means in a generally upwards orientation and does not require an exact geometrical orientation along a certain geometric line or plane, and the terminology horizontal means in a generally sideways orientation and does not require an exact geometric orientation along a certain geometric line or plane.

Furthermore, the phrase of "extending rearward from the head pipe in the side view" includes not only the meaning of extending horizontally rearward from the head pipe in the side view but also the meaning of extending rearward in a direction tilted from the horizontal direction in the side view.

In the above motorcycle, the seal section for supporting the air filter element is positioned above the right and left frame members. Consequently, although a part (i.e., the lower section) of the air cleaner case is disposed between the right and left frame members, a relatively large flow passage area can be secured at the inner side of the seal section. Therefore, according to the aforementioned motorcycle, a sufficient intake volume of air to be supplied to an engine can be secured.

In the aforementioned motorcycle, the seal section is positioned above the right and left frame members. Accordingly, the width of the air filter element can be increased, which in turn can increase the surface area of the air filter element. This secures a sufficient amount of intake volume of air to be supplied to the engine.

According to the aforementioned embodiment of the present invention, it is possible to provide a motorcycle capable of supplying sufficient intake volume of air to be supplied to an engine even in a motorcycle provided with an air cleaner having an air cleaner case disposed between a pair of right and left frames and an air filter element disposed so as to divide a part of the inner space of the air cleaner case into an upper space and a lower space.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, preferred embodiments of the present invention will be described in detail with reference to the drawings.

First Embodiment a. General Structure of Motorcycle

Figure 1:
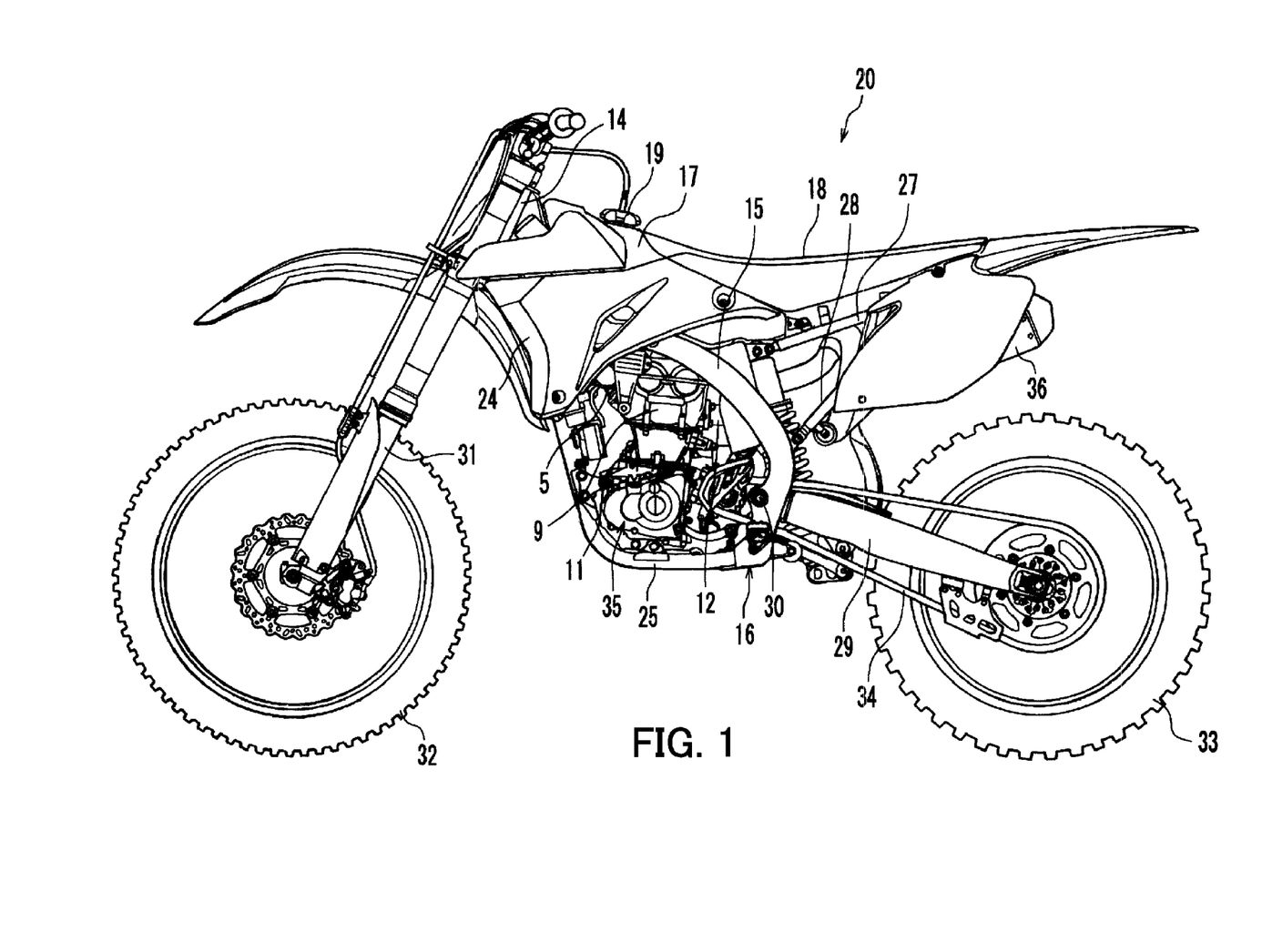
FIG. 1 is a side view of a motorcycle according to a first embodiment of the present invention.

FIG. 1 is a left side view of a motorcycle 20 according to this embodiment. With reference to FIG. 1, a general structure of the motorcycle 20 will be described. In the following description, front, rear, right and left directions are those directions as viewed from the position of a rider seated on a seat 18.

The motorcycle 20 includes a body frame 16 forming a framework and a seat 18 on which a rider is to be seated. This motorcycle 20 is the so-called off-road type motorcycle. A motorcycle according to the present invention, however, is not limited to this type, but can be a motorcycle other than an off-road type (such as, e.g., a road-type motorcycle, a scooter-type motorcycle, or a moped type motorcycle).

Figure 2:
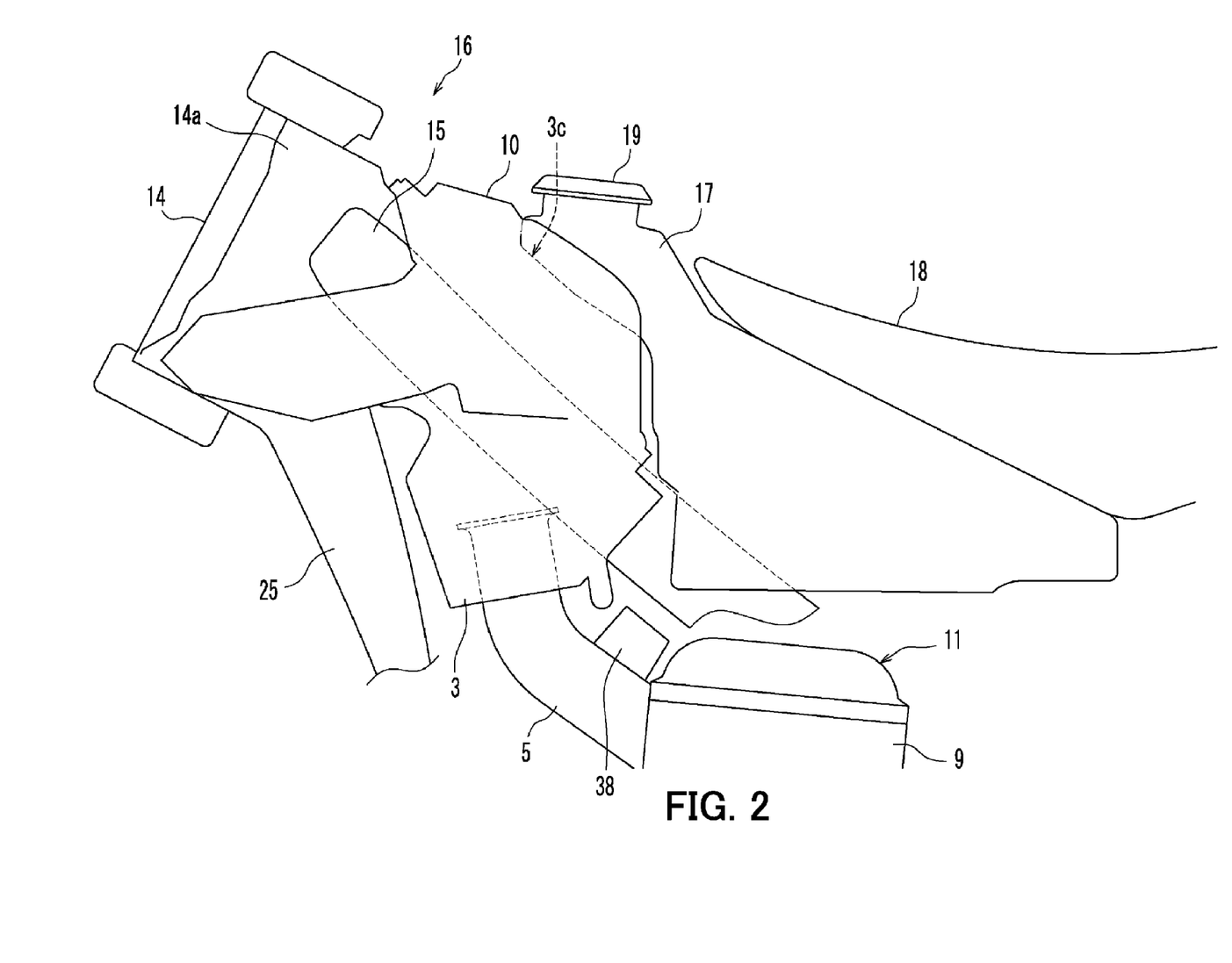
FIG. 2 is an enlarged side view of a part of the motorcycle shown in FIG. 1.

The body frame 16 includes a head pipe 14, a down tube 25, and a main frame 15. As shown in FIG. 2, the down tube 25 extends downward from a bracket 14a of the head pipe 14. On the other hand, the main frame 15 extends rearward from the bracket 14a of the head pipe 14 at a position above the down tube 25. The main frame 15 is constituted by a pair of right and left frame members 15R and 15L (see FIG. 4) that extend rearward from the bracket 14a of the head pipe 14. As shown in FIG. 1, the main frame 15 curves more downward at its more rearward position.

As shown in FIG. 1, a pair of right and left seat rails 27 is connected to the main frame 15 in a rearward extended manner. A back stay 28 is connected to the main frame 15 at a position below a part of the main frame 15 to which the seat rail 27 is connected. Further, rear arms 29 are each pivotally coupled to the lower end of the main frame 15 with a pivot shaft 30 there-between.

The head pipe 14 is supported by a front fork 31. A front wheel 32 is supported at the lower end of the front fork 31. A rear wheel 33 is supported by the rear ends of the rear arms 29. A cover 24 for covering the body frame 16 is provided above the body frame 16 to cover the body frame 16. Further, a fuel tank 17 extends between the main frame 15 and the back stay 28 above thereof. The seat 18 is disposed above the fuel tank 17. Specifically, as shown in FIG. 2, a front portion of the seat 18 including at least its front end is positioned above the fuel tank 17. The front portion of the seat 18 including at least its front end is disposed so as to overlap a rear potion of the fuel tank 17 including at least its rear end as viewed from the top.

As shown in FIG. 1, a power unit 35 is disposed between the down tube 25 and the main frame 15 and attached thereto. The power unit 35 is integrally constituted by an engine 11 for generating driving force, a transmission, and so forth. The power unit 35 is connected to the rear wheel 33 via a power transmission means 34, such as, e.g., a chain, to drive the rear wheel 33. With this structure, the driving force generated by the engine 11 is transmitted to the rear wheel 33 through the power transmission means 34.

The engine 11 has a cylinder 9. The cylinder 9 extends obliquely upward rearward in the side view. The cylinder 9 can be disposed so as to extend straight upward in the side view. Alternatively, the cylinder 9 can be disposed so as to extend obliquely upward forward in the side view. In this embodiment, the engine 11 is a four-cycle single-cylinder engine, but can be a two-cycle engine or a multi-cylinder engine.

As shown in FIG. 2, the cylinder 9 is connected to one end of an intake pipe 5. The intake pipe 5 extends obliquely upward from the cylinder 9 in the side view. The intake pipe 5 extends obliquely forward from the front side of the cylinder 9 in the side view. The other end of the intake pipe 5 is communicated with an air cleaner case 3 of an air cleaner 10. As described in detail later, the air cleaner 10 is configured to purify the air to be supplied to the engine 11 by passing air there-through. Please note that the intake pipe 5 can extend generally horizontally forward from the front side of the cylinder 9. Reference numeral "38" denotes a fuel injection device, or a carburetor, disposed in the midway of the intake pipe 5 for supplying fuel into the intake pipe 5.

With reference again to FIG. 1, one end of an exhaust pipe 12 is connected to the cylinder 9. The exhaust pipe 12 extends obliquely rearward from the rear side of the cylinder 9 in the side view. The other end of the exhaust pipe 12 is connected to a muffler 36. The exhaust pipe 12 can extend generally horizontally rearward from the rear side of the cylinder 9.

The above is a general structure of the illustrative motorcycle 20. Next, the structure of the air cleaner 10 according to an illustrative embodiment of the present invention will be described in detail.

b. Structure of Air Cleaner

Figure 3:
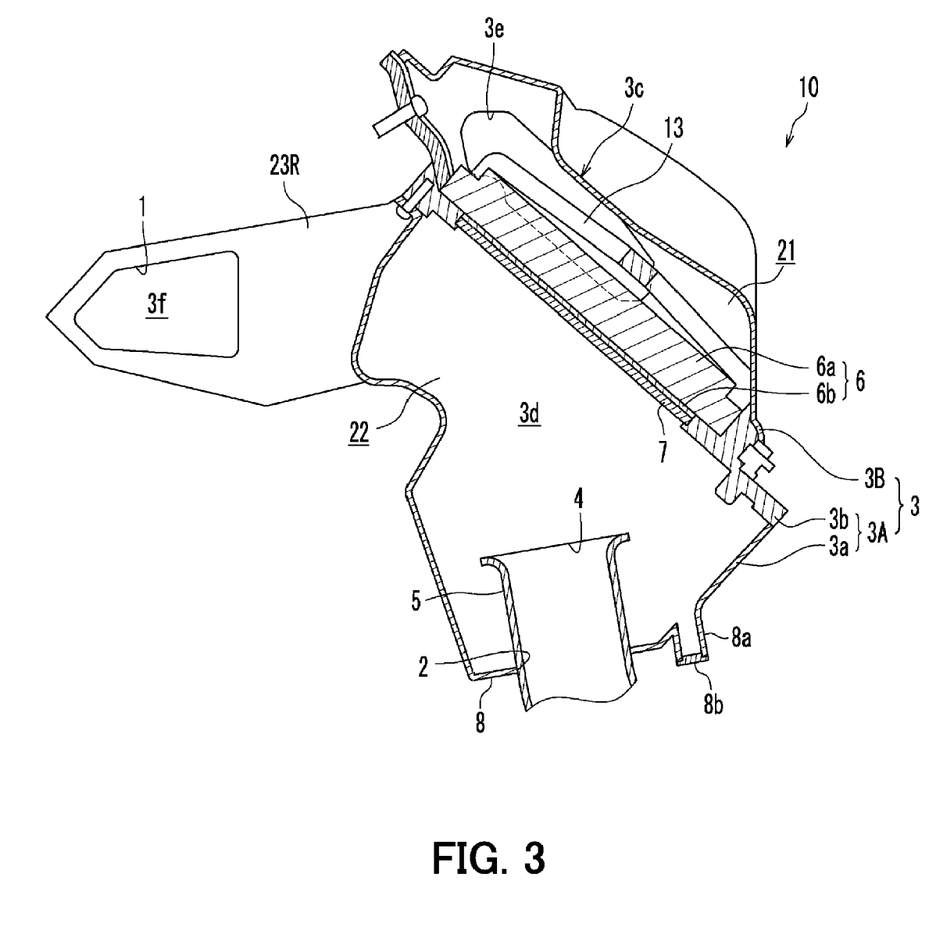
FIG. 3 is a cross-sectional view of an air cleaner mounted on the motorcycle of the first embodiment as viewed from the left side.
Figure 4:
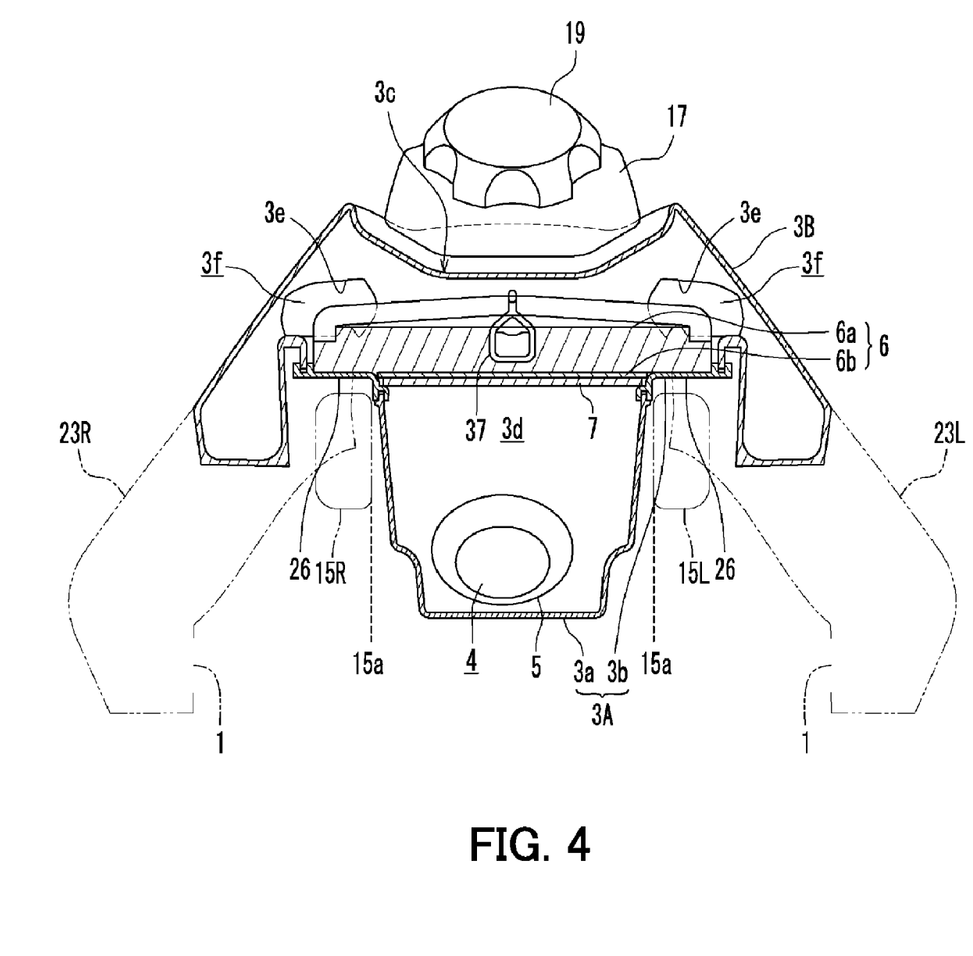
FIG. 4 is a cross-sectional view of the air cleaner mounted on the motorcycle of the first embodiment as viewed from the front side.

FIG. 3 is a cross-sectional view of the air cleaner 10 as viewed from the left side. FIG. 4 is a cross-sectional view of the air cleaner 10 as viewed from the front side. As shown in these figures, the air cleaner 10 has an air cleaner case 3 and an air filter element 6 disposed inside the air cleaner case 3. The air cleaner case 3 includes a first case member 3A, a second case member 3B and two ducts 23R and 23L.

As shown in FIG. 4, the first case member 3A includes a lower section 3a and an upper section 3b. At least a part of the lower section 3a is interposed between the right and left frame members 15R and 15L. In this embodiment, a part of the upper portion of the lower section 3a is interposed between the right and left frame members 15R and 15L. On the other hand, the upper section 3b protrudes above the right and left frame members 15R and 15L from the lower section 3a and extends outward in a lateral direction. The upper section 3b has a seal section 26 for supporting a main air filter element 6a by being brought into contact therewith, which will be described later. The seal section 26 is positioned above the right and left frame members 15R and 15L and at least a part of the seal section 26 is positioned outward of the inner ends 15a of the right and left frame members 15R and 15L in the lateral direction.

The second case member 3B covers the first case member 3A from above and is detachably attached to the first case member 3A. The first case member 3A and the second case member 3B form an inner space 3d for temporarily reserving air and passing it toward the intake pipe 5 in the air cleaner case 3.

The second case member 3B is provided with two openings 3e. The openings 3e are formed at positions generally symmetrically in the lateral direction. Ducts 23R and 23L are attached to the respective openings 3e. The duct 23L disposed at the left side and the duct 23R disposed at the right side are formed into generally symmetrical shapes. The ducts 23R and 23L respectively extend laterally outward in the lateral direction from the second case member 3B and then curve to further extend forward (see FIG. 5). Inlets 1 for introducing the outside air into the ducts 23R and 23L are respectively formed at the front ends of the two ducts 23L and 23R. Inflow passages 3f for introducing the outside air into the inner space 3d (i.e., the dirty-side chamber 21, which will be explained later) are respectively formed in the two ducts 23R and 23L. The two openings 3e are not required to be formed at generally symmetrical positions in the lateral direction. Also, the ducts 23R and 23L are not always required to be formed into generally symmetrical shapes in the lateral direction.

Figure 6A:
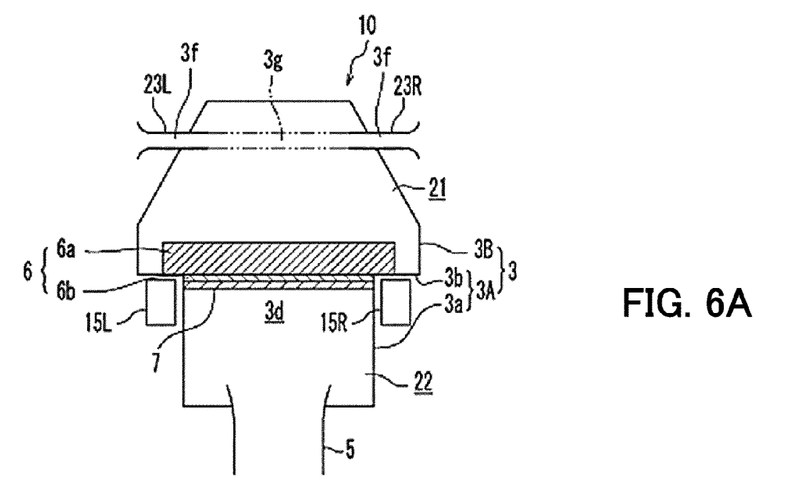
FIGS. 6A and 6B are schematic cross-sectional views of the air cleaner according to the first embodiment.
Figure 6B:
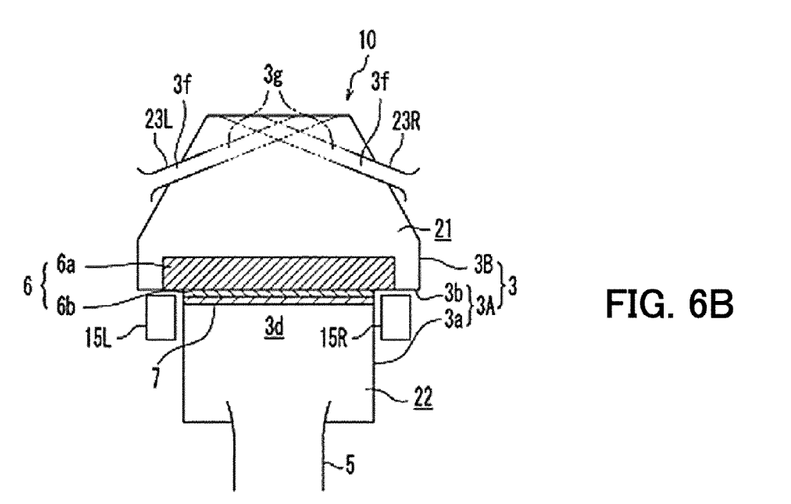

The ducts 23R and 23L are connected to the second case member 3B in such a manner that when the inflow passages 3f are extended toward the inner space 3d side and the inflow passages 3f do not intersect with an upper surface of the air filter element 6. Specifically, as shown in FIGS. 6A and 6B, the ducts 23R and 23L are connected to the second case member 3B so that extended portions 3g (portions within the air cleaner case 3) of the inflow passages 3f extend so as not to intersect with the upper surface of the main element 6a. In other words, the ducts 23R and 23L are connected to the second case member 3B in such a manner that, when the inflow passages 3f are extended toward the inner space 3d side, the extended portions of the inflow passages 3f extend above the upper surface of the air filter element 6.

More specifically, the ducts 23L and 23R can be connected, as shown in FIG. 6A, so that the extended portions 3g of the inflow passages 3f extend generally parallel with the upper surface of the main element 6a. Alternatively, the ducts 23R and 23L can be connected, as shown in FIG. 6B, so that the extended portions 3g of the inflow passages 3f extend in a direction (obliquely upward) deviating from the upper surface of the main element 6a.

As shown in FIG. 3, the lower section 3a of the first case member 3A forming a part of the inner space 3d has a bottom plate 8. The bottom plate 8 is provided with an outlet 2 for ejecting air out of the inner space 3d. Connected to the outlet 2 is the intake pipe 5. The intake pipe 5 is provided with an intake opening 4 opened obliquely upward in the inner space 3d. The intake opening 4 can open upward. The intake pipe 5 extends above the bottom plate 8 in the inner space 3d. Thus, the intake opening 4 is positioned above the bottom plate 8. The intake pipe 5 can be connected to the bottom plate 8 of the air cleaner case 3 so that the intake opening 4 is generally flush with the bottom plate 8 of the air cleaner case 3. In this case, the intake opening 4 opens upward or obliquely upward toward the inner space 3d.

The bottom plate 8 is provided with a drainage section 8a for discharging water stored on the bottom plate 8 due to driving during bad-weather, e.g., rain. In this embodiment, the drainage section 8a is closed by a lid 8b. With this lid 8b, dust is prevented from entering through the drainage section 8a into the clean-side chamber 22, which will be described later. The drainage section 8a can be closed by a sponge or the like instead of the lid 8b. Alternatively, the drainage section 8a can be provided with a backflow prevention device in stead of the lid 8b.

As shown in FIG. 2, at least a part of the air cleaner case 3 is disposed below the fuel tank 17. More specifically, a part of the rear side of the air cleaner case 3 is positioned below a part of the front side of the fuel tank 17. As shown in FIGS. 2 and 4, at least a portion 3c of the air cleaner case 3, which is the part positioned below the fuel tank 17, is dented downward. Accordingly, at least a part of the fuel tank 17 is positioned over the downwardly dented portion 3c of the air cleaner case 3. As shown in FIG. 2, the fuel tank 17 is provided with a cap 19 to cover a filler opening (not shown) opened upward. The cap 19 is positioned above the downwardly dented portion 3c of the air cleaner case 3.

As shown in FIG. 3, in this embodiment, the air filter element 6 is formed into a plate shape. The air filter element 6 includes a main air filter element 6a and an auxiliary air filter element 6b separated from the main air filter element 6a. Both the main air filter element 6a and the auxiliary air filter element 6b are disposed in the inner space 3d. The air filter element 6 divides the inner space 3d, which is at least a part of the inside of the air cleaner case 3, into an upper space and a lower space. More specifically, the air filter element 6 divides the inner space 3d into a dirty-side chamber 21 positioned above the main air filter element 6a and the clean-side chamber 22 positioned below the auxiliary air filter element 6b.

Once again, in this disclosure, "divide the inner space into an upper space and a lower space" includes not only the meaning of dividing the inner space into an upper space and a lower space in a generally vertical direction with a horizontal plane but also the meaning of dividing the inner space into an upper space and a lower space in a direction inclined with respect to a generally vertical direction with a plane inclined from a generally horizontal plane as shown in this embodiment (in other words, obliquely dividing the inner space into an upper space and a lower space).

The main air filter element 6a is disposed above the intake opening 4. The main air filter element 6a is supported by the seal section 26 of the upper section 3b of the first case member 3A and thereby sealed around its circumference. On the other hand, the auxiliary air filter element 6b is attached to the upper section 3b so as to be positioned above the intake opening 4 but below the main air filter element 6a. In this embodiment, the main air filter element 6a is configured such that the main air filter element 6a can be detached from the upper section 3b with the auxiliary air filter element 6b attached to the upper section 3b. In other words, the main air filter element 6a is configured to be detachable from the upper section 3b in a state in which the auxiliary air filter element 6b is attached within the inner space 3d.

The main air filter element 6a is constituted by an air filter element finer than the auxiliary air filter element 6b. In other words, the auxiliary air filter element 6b has a fineness coarser than that of the main air filter element 6a. However, the main air filter element 6a and the auxiliary air filter element 6b can have the same fineness. Further, the main air filter element 6a can have a fineness coarser than that of the auxiliary air filter element 6b.

Figure 5:
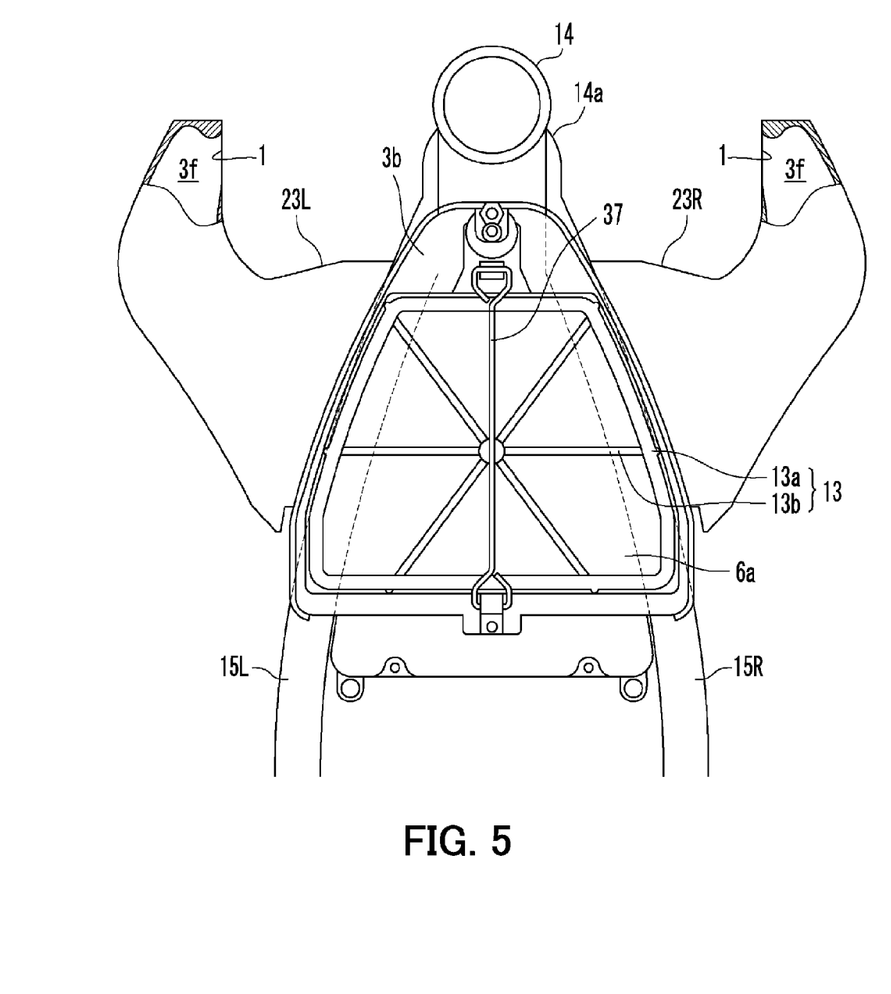
FIG. 5 is a top view of the air cleaner and the vicinity thereof of the first embodiment as viewed from above in a state in which a second case member of the air cleaner is detached.

As shown in FIG. 5, a pressing member 13 is disposed above the main air filter element 6a. The pressing member 13 is configured to press the main air filter element 6a downward or obliquely downward. In this embodiment, the pressing member 13 includes a frame 13a having a generally trapezoidal shape and six ribs 13b radially extending from the center of the frame 13a. Also, in this embodiment, the pressing member 13 is fixed by a detachable fixing member 37. In FIG. 3, the fixing member 37 is not shown.

Further as shown in FIG. 3, in this embodiment, a flameproof net 7 is disposed under the auxiliary air filter element 6b. The flameproof net 7 extinguishes flames caused by a backfire (backfire is a phenomenon in which mixture gas to be combusted in the cylinder 9 causes back flow of flames to the intake pipe 5, etc.) from the engine 11 and thereby prevents the air filter element 6 from being burned by the flames.

With the above construction, the outside air taken from the inlets 1 into the ducts 23R and 23L is introduced into an upper portion (dirty-side chamber 21) in the inner space 3d through the inflow passages 3f. The air further flows from the upper portion to the lower portion (from the dirty-side chamber 21 to the clean-side chamber 22) in the inner space 3d. At this time, the air passes through the main air filter element 6a and the auxiliary air filter element 6b. Dust, etc., in the air is captured by the main air filter element 6a as the air passes through the main air filter element 6a. As a result, the air is purified. In this embodiment, the auxiliary air filter element 6b has a fineness coarser than that of the main air filter element 6a. Therefore, dust, etc., is mostly captured by the main air filter element 6a but hardly captured by the auxiliary air filter element 6b. The air passed through the air filter element 6 flows into the intake pipe 5 through the intake opening 4. The air is then supplied to the cylinder 9 in the engine 11 through the intake pipe 5.

Next, a maintenance work (replacement, washing or cleaning) of the air filter element 6, which is one of maintenance works of the air cleaner 10, will be described.

Generally, under normal use, an air filter element of an air cleaner becomes clogged with captured dust, etc., and becomes dirty, resulting in reduced purification performance. This necessitates regular replacement. In the air cleaner 10 according to this embodiment, the air filter element 6 includes the main air filter element 6a and the auxiliary air filter element 6b having a fineness coarser than that of the main air filter element 6a. Accordingly, dust capable of being captured by the auxiliary air filter element 6b is mostly captured by the main air filter element 6a. As a result, the auxiliary air filter element 6b has less dirt. Therefore, it is possible in the air cleaner 10 to recover the reduced purification performance by replacing, washing or cleaning only the main air filter element 6a when the air filter element 6 is subjected to replacement, washing or cleaning. The maintenance work (replacement, washing or cleaning) of the main air filter element 6a will be described below.

First, the second case member 3B is detached from the first case member 3A. After detaching the second case member 3B, the fixing member 37 for fixing the pressing member 13 is disengaged to detach the pressing member 13. Next, the main air filter element 6a is detached from the seal section 26 of the upper section 3b of the first case member 3A. It should be noted that the main air filter element 6a is placed on the seal section 26. Accordingly, the main air filter element 6a can be detached with a simple work of lifting the main air filter element 6a. The main air filter element 6a is constructed to be detachable from the upper section 3b of the first case member 3A with the auxiliary air filter element 6b fixed in the inner space 3d. Accordingly, the auxiliary air filter element 6b remains fixed in the inner space 3d after detaching the main air filter element 6a.

As described above, in the state in which the auxiliary air filter element 6b remains fixed in the inner space 3d, a replacing main air filter element 6a is then placed on the seal section 26 of the upper section 3b. Alternatively, after washing or cleaning the detached main air filter element 6a, the washed or cleaned main air filter element 6a is replaced on the seal section 26 of the upper section 3b. Following the reverse procedure of the procedure described above, the pressing member 13 and the fixing member 37 are attached. Finally, the second case member 3B to which the ducts 23R and 23L are attached is assembled so as to cover the first case member 3A from above. With the above work, it is possible to recover the purification performance of the air filter element 6 by replacing, washing or cleaning the main air filter element 6a. Thus, the maintenance work of the air cleaner 10 is completed.

As described above, in the motorcycle 20 according to this embodiment, the seal section 26 for supporting the main element 6a is positioned above the pair of the right and left frame members 15R and 15L. Consequently, although a part (i.e., the lower section 3a) of the air cleaner case 3 is disposed between the right and left frame members 15R and 15L, a relatively large area of inflow passage can be secured at the inner side of the seal section 26. Therefore, according to the motorcycle 20, a sufficient intake volume of air to be supplied to the engine 11 can be secured.

In the motorcycle 20, the seal section 26 is positioned above the right and left frame members 15R and 15L. Consequently, the width of the main element 6a can be increased. Accordingly, the surface area of the main element 6a can be increased. This secures a sufficient intake volume of air to be supplied to the engine 11.

In this motorcycle 20, the air filter element 6 of the air cleaner 10 is formed into a plate shape. Accordingly, in comparison with the structure in which the seal section 26 is disposed between the right and left frame members 15R and 15L, a larger surface area of the element 6 can be secured. As a result, even if the air filter element 6 is formed into a plate shape as shown in this embodiment, a sufficient surface area can be secured.

Also, in this motorcycle 20, since the air filter element 6 is in a plate shape, the air filter element 6 does not protrude upward, which makes the vertical length (i.e., height) of the air cleaner case 3 relatively short.

Further, the motorcycle 20 includes the fuel tank 17, a part of which is positioned above the air cleaner case 3. In other words, at least a part of the fuel tank 17 and at least a part of the air cleaner case 3 overlap vertically. Nevertheless, according to the motorcycle 20 described above, a large surface area can be secured for the air filter element 6 without largely protruding the element 6 upward. Consequently, the height (vertical length) of the air filter element 6 and that of the air cleaner case 3 can be reduced. Therefore, according to the motorcycle 20, even though the fuel tank 17 and the air cleaner case 3 overlap vertically, the fuel tank 17 can be prevented from largely protruding upward. In addition, according to the motorcycle 20, the height of an upper face of the fuel tank 17 can be reduced while securing a relatively large capacity of the fuel tank 17.

In this motorcycle 20, the portion 3c of the air cleaner case 3 positioned below the fuel tank 17 is dented downward. Accordingly, at least a part of the fuel tank 17 can be positioned over the downwardly dented portion 3c of the air cleaner case 3. Therefore, according to the motorcycle 20, although the fuel tank 17 and the air cleaner case 3 overlap vertically, the fuel tank 17 can be prevented from largely protruding upward. In addition, according to the motorcycle 20, the height of an upper face of the fuel tank 17 can be further reduced while securing a relatively large capacity of the fuel tank 17.

In this motorcycle 20, at least a part of the seat 18 is disposed above the fuel tank 17. Specifically, a front portion of the seat 18 including its front end is positioned above the fuel tank 17. As described above, in this motorcycle 20, the height (vertical length) of the air cleaner case 3 can be reduced. Therefore, according to the motorcycle 20, although the air cleaner case 3 and the fuel tank 17 overlap vertically and the fuel tank 17 and the seat 18 overlap vertically, the vehicle height (vertical length from the ground to the seat 18) can be reduced.

In this motorcycle 20, the fuel tank 17 includes the cap 19. Generally, when the cap 19 is disposed on an upper part of the fuel tank 17, the height of the fuel tank 17 is increased by the thickness of the cap 19. However, in this motorcycle 20, the cap 19 is positioned above the downwardly dented portion 3c of the air cleaner case 3. Accordingly, even though the cap 19 is disposed on an upper part of the fuel tank 17, the height of the fuel tank 17 can be reduced while securing a relatively large capacity of the fuel tank 17.

Meanwhile, when air having a high flow velocity directly hits the air filter element 6, the air flows through the part (part directly hit by the air) in a concentrated manner. This results in large dispersion of flow velocity of the air that passes through the element 6. Consequently, the air filter element 6 may not be utilized uniformly, which may cause partially soiled or clogged portion. In contrast, in this motorcycle 20, the ducts 23R and 23L are connected to the second case member 3B in such a manner that when the inflow passages 3f are extended toward the inner space 3d side (dirty-side chamber 21 side), the inflow passages 3f do not intersect with an upper surface of the air filter element 6. Thus, the air cleaner 10 of the motorcycle 20 is constructed such that the air supplied to the dirty-side chamber 21 does not directly hit the air filter element 6. As a result, according to this motorcycle 20, the air filter element 6 can be utilized uniformly, thereby preventing the air filter element 6 from being intensively soiled or being clogged.

The air cleaner 10 according to the present invention is especially suitable for an off-road motorcycle 20 as shown in this embodiment. In off-road motorcycles, such as, e.g., in motocross-type off-road motorcycles, the rider sometimes operates a motorcycle with his/her hip lifted without being seated on the seat 18. Due to this, in an off-road motorcycle, the portion between the right and left frame members 15R and 15L, which is to be pinched by and between the rider's legs, is formed to be as narrow as possible to allow the rider to easily lift his/her hip. Accordingly, in an off-road motorcycle 20, although a part (e.g., the lower section 3a) of the air cleaner case 3 is disposed between the right and left frame members 15R and 15L, the effect that a relatively large area of inflow passage can be secured at the inner side of the seal section 26 can be remarkably achieved.

Second Embodiment

Figure 7:
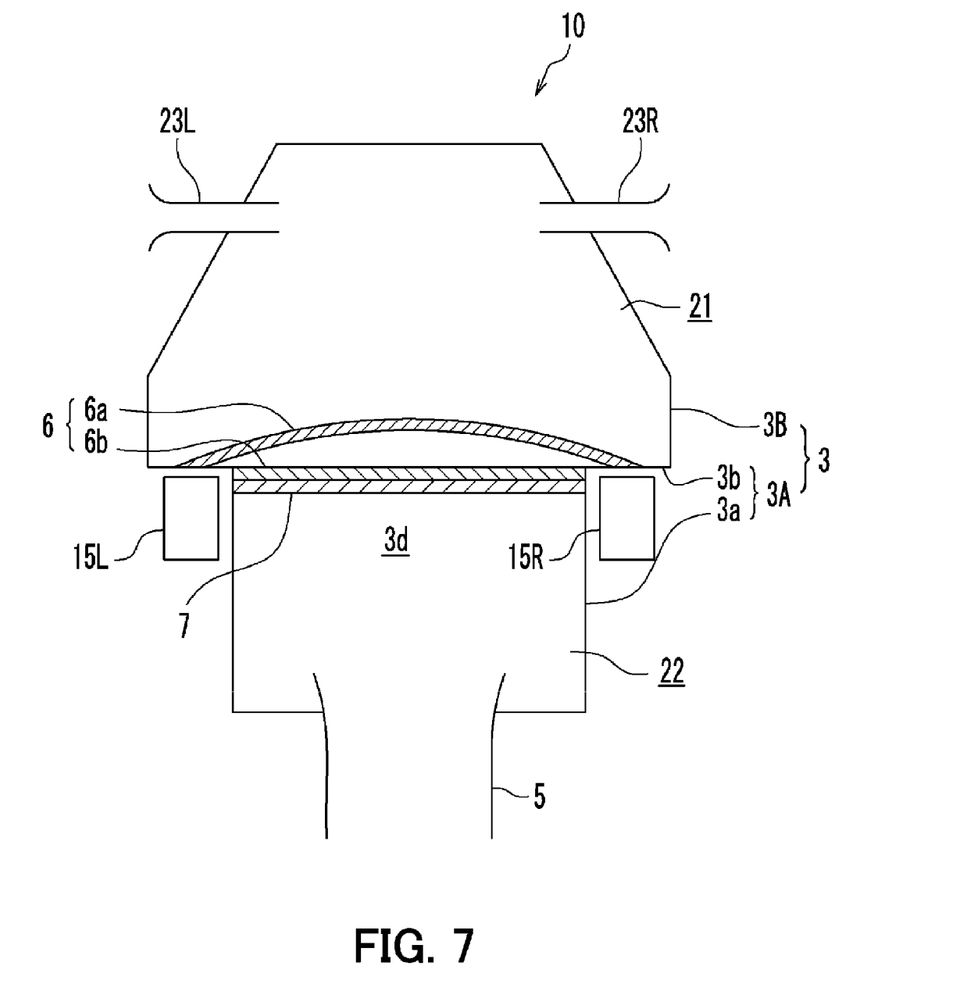
FIG. 7 is a schematic cross-sectional view of an air cleaner according to a second embodiment.

As shown in FIG. 7, a motorcycle 20 according to a second embodiment is constructed such that a main element 6a having a larger area than the main element 6a in the first embodiment is formed into an upwardly curved convex shape. In this embodiment, the structure other than the above is the same as in the first embodiment and, therefore, further description thereof is not necessary and is omitted, while using the same reference numerals to indicate similar portions as set forth above.

As described above, in the air cleaner 10 according to the second embodiment, the main element 6a having a large area is formed into an upwardly curved convex shape. Therefore, a large surface area of the main element 6a can be secured without widening the air cleaner case 3. Also, in the air cleaner 10 according to the second embodiment, the vertical length of the air cleaner case 3 can be reduced in comparison with a conventional air cleaner in which an element is formed into a bowl shape. Similarly, in the second embodiment, contradictory objects, securing a sufficient intake volume of air to be supplied to the engine 11 while securing a relatively large flow passage area versus reducing the vertical length of the air cleaner case 3, can be attained at the same time.

In the second embodiment, the main element 6a is formed into an upwardly curved convex shape. However, the main element 6a can be formed into a downwardly curved convex shape. In this configuration also, the same effects as mentioned above can be achieved. Further, the main element 6a can be formed into an upwardly curved convex bowl shape.

In the second embodiment, only the main element 6a is disposed in a curved manner. However, it is a matter of course that either one of or both of the auxiliary element 6b and the flameproof net 7 can be disposed in a curved manner.

Figure 8:
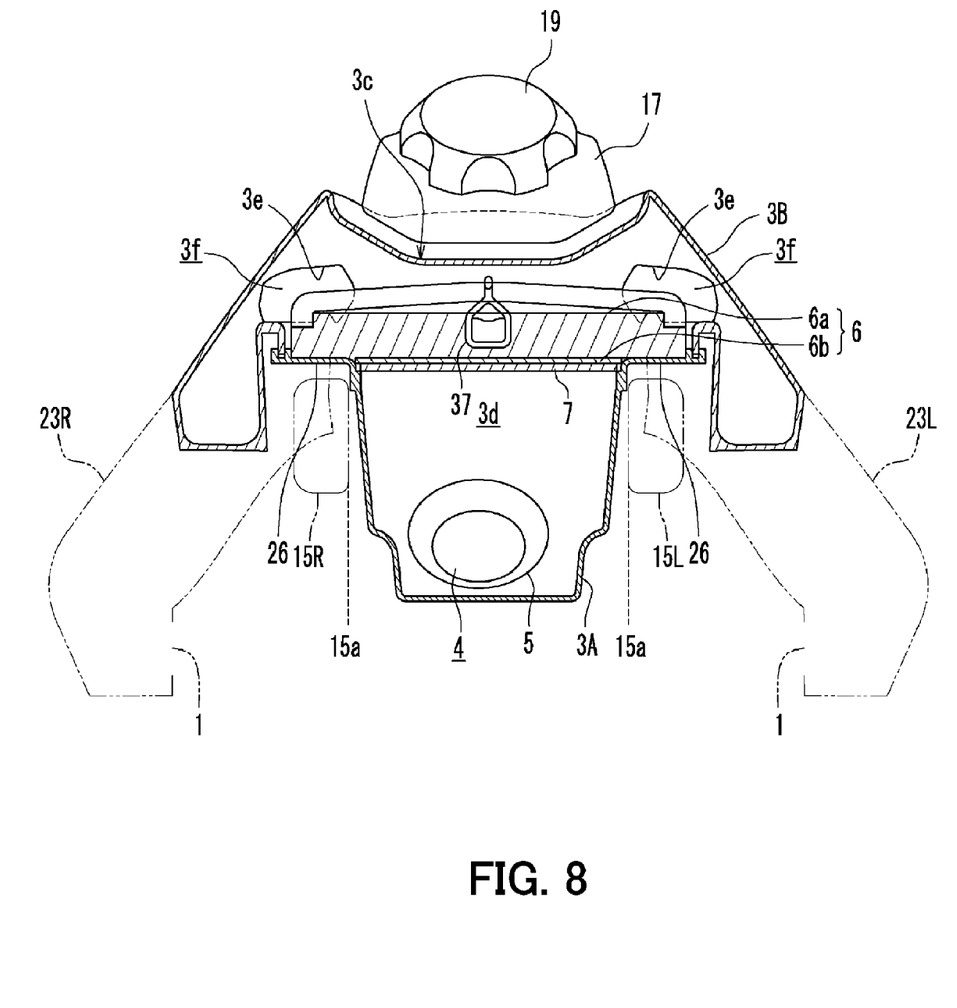
FIG. 8 is a cross-sectional view of an air cleaner according to a modified embodiment as viewed from the front side.

In each of the embodiments described above, the first case member 3A is constructed by the lower section 3a and the upper section 3b, which are separate from each other. However, as shown in FIG. 8, the first case member 3A can be integrally formed. According to the thus configured motorcycle 20, the first case member 3A of the air cleaner 10 can be formed into one piece. Therefore, it is possible to reduce the number of parts.

Figure 9A:
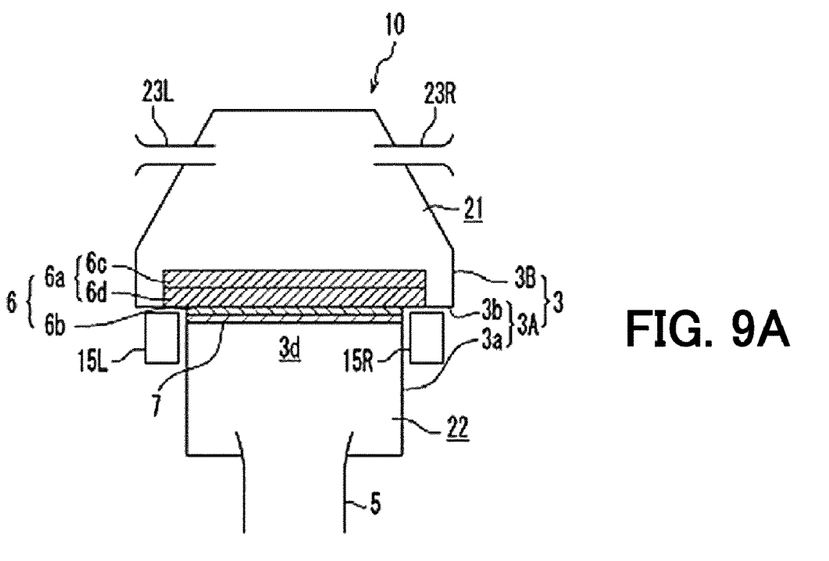
FIGS. 9A and 9B are schematic views of air cleaners according to modified embodiments.
Figure 9B:
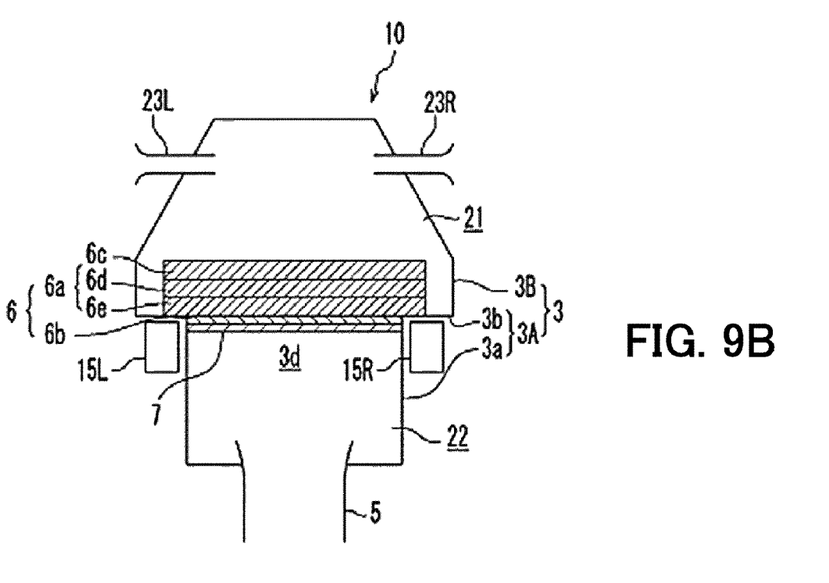

In each of embodiments described above, the main air filter element 6a is configured by a single element member (single-layered configuration). However, the main air filter element 6a can be multi-layered. Specifically, as shown in FIG. 9A, the main air filter element 6a can be double-layered in which a first element 6c and a second element 6d having a fineness finer than that of the first element 6c are provided. As shown in FIG. 9B, the main air filter element 6a can be triple-layered in which a first element 6c, a second element 6d having a fineness finer than that of the first element 6c, and a third element 6e having a fineness finer than that of the second element 6d are provided. Further, the main element 6a can have more layers. Thus, the air filter element can be configured such that a plurality of air filter elements are layered so that a downstream side element has a finer element. This improves air purification performance. In the multi-layered configuration described above, it is preferable that the air filter elements constituting the respective layers can be integrally replaced.

INDUSTRIAL APPLICABILITY

As described above, the present invention can be applicable to a motorcycle equipped with an air cleaner.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A motorcycle, comprising:
a body frame having a head pipe and right and left frame members extending rearward from the head pipe in a side view thereof; and
an air cleaner having an air cleaner case and an air filter element disposed inside the air cleaner case for purifying air to be supplied to an engine by passing the air there-through,
wherein the air cleaner case includes
a lower section, at least a part of the lower section being disposed between the right and left frame members, and
an upper section having a seal section disposed above the frame members, at least a part of the seal section being positioned laterally outward of inner ends of the right and left frame members, and the upper section upwardly protruding from the lower section so as to be positioned above the right and left frame members and laterally extending outward of the right and left frame members, and
wherein the air filter element is supported and sealed by the seal section and divides at least a part of an inner space of the air cleaner case into an upper space and a lower space.

2. The motorcycle as recited in claim 1, wherein the air filter element is formed into a plate shape.

3. The motorcycle as recited in claim 2, wherein the air filter element is formed into an upwardly protruded convex shape.

4. The motorcycle as recited in claim 1, wherein the air filter element is includes a multi-layered member.

5. The motorcycle as recited in claim 4, wherein the multi-layered member includes a plurality of elements that are different in fineness.

6. The motorcycle as recited in claim 1, further comprising a fuel tank, wherein a part of the fuel tank is positioned above the air cleaner case.

7. The motorcycle as recited in claim 6, wherein a part of the air cleaner case positioned below the fuel tank is formed into a downwardly dented portion.

8. The motorcycle as recited in claim 6, further comprising a seat, wherein a part of the seat is positioned above the fuel tank.

9. The motorcycle as recited in claim 6, wherein the fuel tank is equipped with a cap positioned above a part of the air cleaner case.

10. The motorcycle as recited in claim 9, wherein the cap is positioned above a downwardly dented portion of the air cleaner case.

11. The motorcycle as recited in claim 1,
wherein the air cleaner case includes a dirty-side chamber positioned above the air filter element and a duct forming an inflow passage for introducing outside air into the dirty-side chamber, and
wherein the duct is connected to the dirty-side chamber such that when the inflow passage is extended into the dirty-side chamber, an extended part of the inflow passage does not intersect with an upper surface of the element.

12. The motorcycle as recited in claim 1,
wherein the air cleaner case includes a first case member having the upper section and the lower section and a second case member detachably attached to the first case member to cover the first case member from above, and
wherein the first case member is an integrally formed member.

13. The motorcycle as recited in claim 12, wherein an intake pipe for introducing air in the inner space of the air cleaner case into the engine is connected to a bottom portion of the first case member.

14. The motorcycle as recited in claim 13, wherein the intake pipe has an intake opening positioned above the bottom portion of the first case member.

15. The motorcycle as recited in claim 12, wherein the first case member has a discharge section for discharging water accumulated in the air cleaner case.

16. The motorcycle as recited in claim 15, wherein the discharge section is closed by a lid.

17. The motorcycle as recited in claim 1, wherein the motorcycle is an off-road type motorcycle.

18. A motorcycle, comprising:
- a body frame including a head pipe and right and left frame members extending rearward from the head pipe in a side view thereof; and
- an air cleaner having an air cleaner case and an air filter element disposed inside the air cleaner case for purifying air to be supplied to an engine by passing the air there-through,
- wherein the air cleaner case includes a first case member and a second case member detachably attached to the first case member,
- wherein at least a lower portion of the first case member is positioned between the right and left frame members,
- wherein the first case member has a seal section extended laterally outward of the right and left frame members and positioned above the right and left frame members,
- wherein the air filter element is disposed on the seal section in an air-tightly sealed manner so as to divide an inner space of the air cleaner case.

19. The motorcycle as recited in claim 18,
- wherein the inner space of the air cleaner case is divided by the air filter element into a dirty-side chamber positioned above the air filter element and a clean-side chamber below the air filter element,
- wherein the air cleaner case has a duct forming an inflow passage for introducing outside air into the dirty-side chamber, and
- wherein the duct is connected to the dirty-side chamber such that when the inflow passage is extended into the dirty-side chamber, an extended part of the inflow passage does not intersect with an upper surface of the element.

* * * * *